US007469407B2

(12) United States Patent
Burky et al.

(10) Patent No.: US 7,469,407 B2
(45) Date of Patent: Dec. 23, 2008

(54) METHOD FOR RESOURCE BALANCING USING DISPATCH FLUSH IN A SIMULTANEOUS MULTITHREAD PROCESSOR

(75) Inventors: William E. Burky, Austin, TX (US); Richard J. Eickemeyer, Rochester, MN (US); Ronald N. Kalla, Round Rock, TX (US); David S. Levitan, Austin, TX (US); Balaram Sinharoy, Poughkeepsie, NY (US); John W. Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 10/422,685

(22) Filed: Apr. 24, 2003

(65) Prior Publication Data

US 2004/0216105 A1    Oct. 28, 2004

(51) Int. Cl.
G06F 12/00 (2006.01)
G06F 13/00 (2006.01)
G06F 13/28 (2006.01)
G06F 9/46 (2006.01)
G06F 9/30 (2006.01)
G06F 9/40 (2006.01)
G06F 15/00 (2006.01)

(52) U.S. Cl. ............... 718/104; 711/135; 712/216; 712/219

(58) Field of Classification Search ............... 712/219, 712/216; 718/104; 711/135
See application file for complete search history.

(56) References Cited

U.S. PATENT DOCUMENTS 5,596,733 A  1/1997  Worley ............... 395/591
5,937,187 A * 8/1999 Kosche et al. ............ 718/104
6,694,425 B1  2/2004 Eickemeyer ............ 712/216
2002/0087840 A1  7/2002 Kottapalli ............ 712/219

FOREIGN PATENT DOCUMENTS

JP  PUPA07-248897  9/1995
JP  PUPA2001-356903  12/2001

OTHER PUBLICATIONS

Dorai, G.K., et al., Transparent Threads: Resource Sharing in SMT Processors for High Single-Thread Performance, Parallel Architectures and Compilation Techniques, 2002 International Conference on IEEE, Sep. 25, 2002, pp. 30-41.
"Selective Flush of Shared and Other Pipeline Stages In A Multithread Processor," U.S. Appl. No. 09/564,930, filed May 4, 2000; pp. 1-37 (pending patent application).

* cited by examiner

*Primary Examiner*—Meng-Ai An
*Assistant Examiner*—Eric C Wai
(74) *Attorney, Agent, or Firm*—Casimer K. Salys; Winstead, P.C.

(57) ABSTRACT

The processing of instructions from multiple threads using a shared dispatch pipeline is controlled by invoking a dispatch flush operation wherein instructions of a selected thread in the shared dispatch pipeline are flushed in response to resource requirements. A first thread in an SMT may be using more processing than corresponds to its priority because its instructions are dominating use of a shared resource. In this case, to rebalance instruction dispatch between the first thread and the second thread, a dispatch flush of instructions of the first thread is issued. Normally the flushed instructions of a thread are refetched and reenter the dispatch pipeline. If the first thread is dominating use of shared resources, hold may be issued following the dispatch flush holding instructions of the first thread until a balanced utilization is realized.

5 Claims, 5 Drawing Sheets

METHOD FOR RESOURCE BALANCING USING DISPATCH FLUSH IN A SIMULTANEOUS MULTITHREAD PROCESSOR

CROSS REFERENCE TO RELATED APPLICATION

The present invention is related to the following U.S. patent application which is incorporated by reference:

Ser. No. 10/422,676, entitled "A Method Using Dispatch Flush In A Simultaneous Multithread Processor To Resolve Exception Conditions," filed concurrently herewith.

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. The more functional units a processor has available, the lower the percentage of units doing useful work is at any given time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless (just as adding another processor in a system that uses a singly threaded program is useless in a traditional multiprocessor (MP) system). One approach to making the functional units in a CMP more efficient is to use course-grained multithreading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (ILP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to misprediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

An SMT processor has various elements that are broadly termed resources. A resource may be an execution unit, a register rename array, a completion table, etc. Some resources are thread specific, for example each thread may have its own instruction queue where instructions for each thread are buffered. Execution units are shared resources where instructions from each thread are executed. Likewise a register rename array and a completion table in a completion unit may be shared resources. If the entries in a shared register rename array are mostly assigned to one thread then that thread may be using an excessive amount of this shared resource. If the other thread needs a rename register to proceed, then it may be blocked because of a resource requirement and be unable to be dispatched. Other elements in a system that comprises an SMT processor may be termed resources and may not apply to the problems addressed by the present invention if those resources do not slow execution of instructions from multiple threads.

In an SMT processor, there may be an in-order shared pipeline that is part of a larger pipelined process for doing out-of-order instruction execution in multiple execution units. For example, instructions from two threads may be alternately loaded into a shared pipeline comprising an instruction fetch unit (IFU) and instruction dispatch unit (IDU). The instruction addresses are alternately loaded into an instruction fetch address register (IFAR) in the IFU. Instructions are placed in instruction queues for each thread and instructions are selected for dispatch in proportion to their respective instruction execution priority. Instructions are dispatched when required resources are available. Some of the resources may be thread specific and some may be shared between threads (e.g., shared group completion table). If one thread is using an excessive amount of the shared resources, it may result in an imbalance in instruction execution priority between threads. In some cases, a thread may be dispatching an instruction with a long latency resource requirement that does not allow other instructions to dispatch until its resource requirements are satisfied. There are cases where this type of instruction may potentially block for a very long time (e.g., TLBIE, SYNC, etc.). There is, therefore, a need for a method and circuitry to detect and remedy an imbalance in instruction execution due to resource usage. Additionally, a hold off mechanism is needed that controls when instructions with long latency resource requirements are refetched and reenter the dispatch pipeline.

SUMMARY OF THE INVENTION

An SMT processor has a single instruction decode and dispatch pipeline shared by multiple threads. A dispatch flush mechanism detects a condition where an instruction from one thread is "stuck" preventing the other thread from progressing. The dispatch flush mechanism determines the oldest group in the shared pipeline. The oldest group is flushed and refetched before it is actually dispatched in order to clear the pipeline so that the other thread may make progress. A dispatch hold mechanism is used in combination with the dispatch flush mechanism to keep a thread from repeatedly using the shared pipeline resource where it would be repeatedly flushed and refetched.

A dispatch flush operation is usually issued when it is desirable to flush instructions of a thread in a shared dispatch pipeline that is causing a pipeline stall. Dispatch flushes are more efficient than a general flush as they affect a smaller portion of the SMT processor. Resource requirements for a first thread in an SMT may result in instructions using an excessive amount of the shared resources. Because the first thread is dominating shared resources, it may have processing usage out of proportion with its allocated priority. A second thread may be slowed because of shared resource usage by the first thread.

Embodiments of the present invention issue a dispatch flush for the thread that is dominating shared resources to more evenly balance processing between the first and second thread. If a single dispatch flush does not improve the imbalance between threads, then a hold action may also be issued after the dispatch flush wherein instructions of the offending thread are held for a period and not allowed to dispatch. During one type of hold, instructions may be flushed from a dispatch queue, loaded into the dispatch queue, but are not dispatched to the issue queues.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
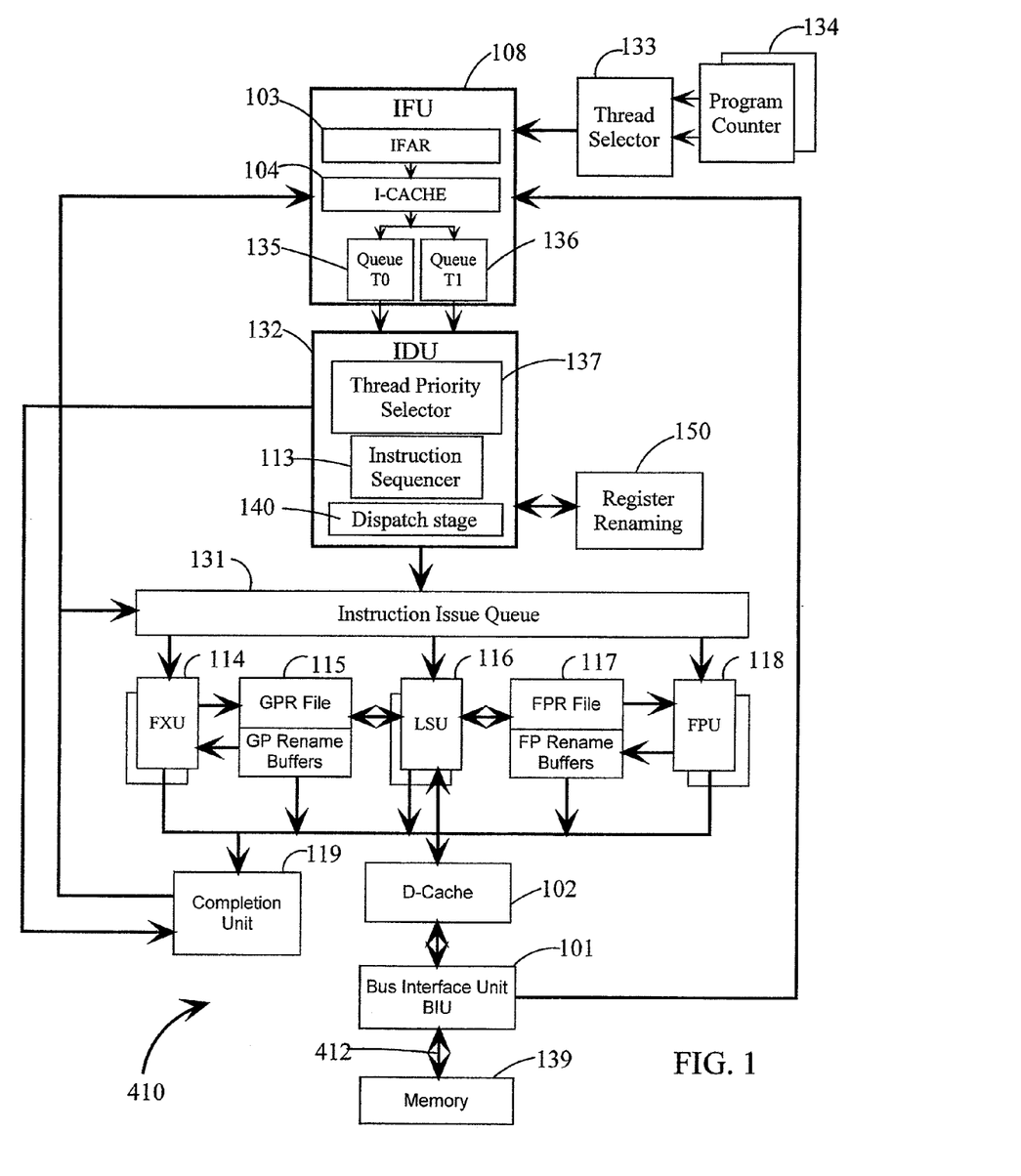
FIG. 1 is a block diagram of functional units in an SMT processor according to embodiments of the present invention.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are dispatched to instruction issue queue (IIQ) 131 by dispatch stage 140. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is dispatched to an issue queue, each architected register is renamed. Each architected register that is being modified is assigned a physical register and a corresponding look-up table identifies physical registers that are associated with an architected register. Therefore in the issue queues, the architected register has been renamed so that multiple copies of an architected register may exist at the same time. This allows instructions to be executed out-of-order as long as source operands are available. Register renaming unit 150, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache 102 for near term use and/or forwarded to bus interface unit (BIU) 101 which sends the data over bus 412 to memory 139. LSU 116 may load data from D-Cache 102 for use by the execution units (e.g., FXU 114).

SMT processor 410 has pipeline stages comprising circuitry of the IFU 108 and circuitry of the IDU 132 that is shared between two threads. Instructions are loaded into a pipeline stages alternately from each thread in program order. As the instructions are accessed from I-Cache, 104 they are queued in a T0 queue 135 and a T1 queue 137. Instructions are selected from these queues either equally or according to a thread priority selector 137 which selects from each thread substantially in proportions the thread's priority. An instruction sequencer 113 in the IDU 132 combines the instructions from each thread into instruction groups of up to five instructions per group. The instructions from the thread groups are issued to instruction issue queues 131 that feed multiple execution units (e.g., 114, 116, and 118). Instructions in the instruction groups are in program order when they are dispatched to instruction issue queues 131 and to the completion table (not shown) in completion unit 119. However, instructions may be issued to the execution units out-of-order.

Instructions that have been issued to the issue queues 131 do not necessarily present a blocking problem, however instructions may not dispatch from dispatch pipeline stage 140 if required shared resources (e.g., shared completion table) are not available. If an instruction from one thread is waiting for shared resources in use by another thread, it may not dispatch thus blocking the dispatch other instructions. The instruction blocking dispatch may be a long resource latency instruction such as a Translation Look Aside Buffer Immediate Exception (TLBIE) instruction or a Sync instruction. If a first thread uses an excess of shared resources, it may slow the dispatch of instructions from IDU 132 for the second thread and thus limit instruction execution and completion from second thread. In this case, the result may be that the second thread may dispatch instructions and thus complete instruction executions below its allocated thread priority based on shared resource utilization.

Figure 2:
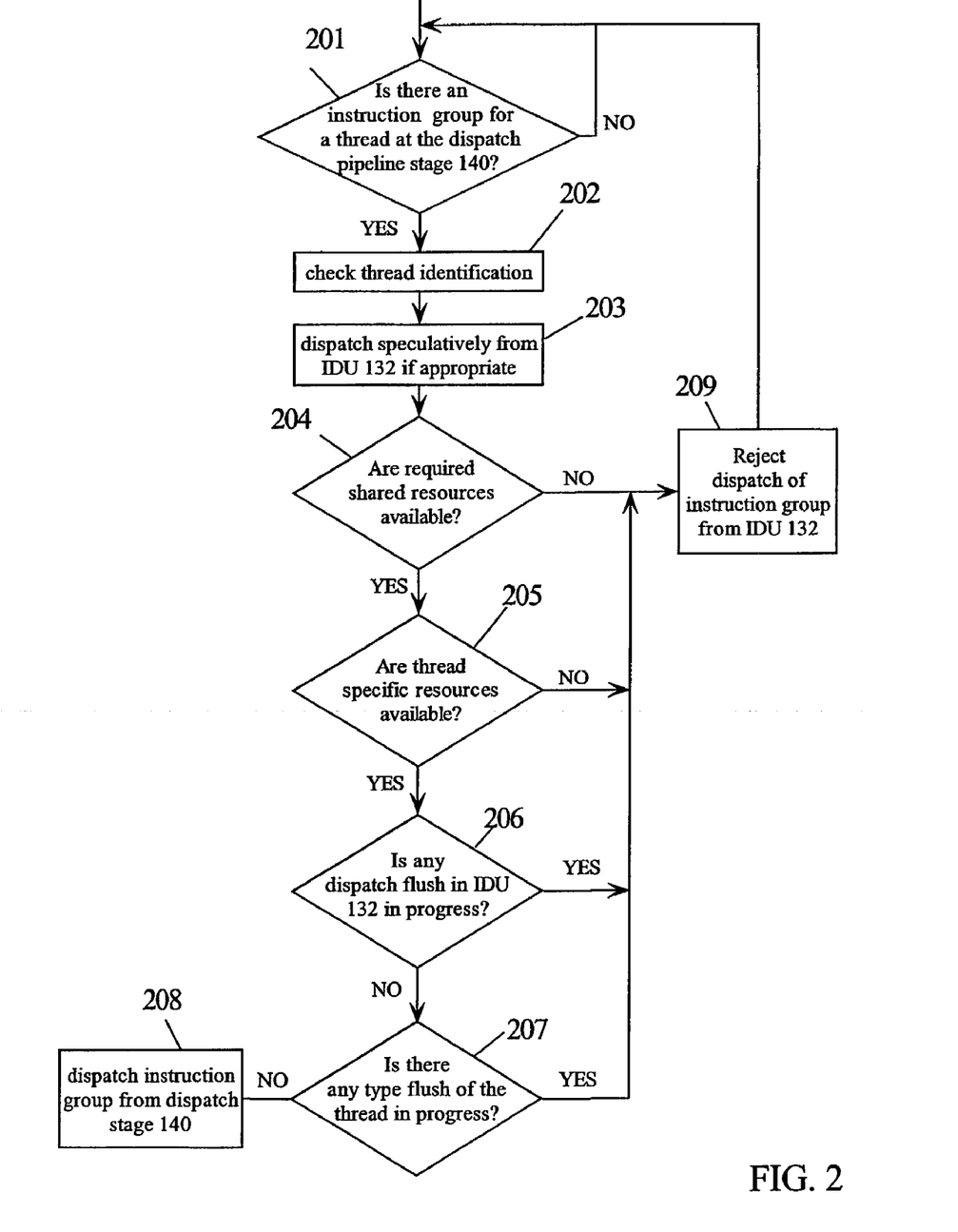
FIG. 2 is a flow diagram of method steps used in dispatching a group of instructions in an SMT processor.

FIG. 2 is a flow diagram of method steps used in dispatching a group of instructions from a thread in an SMT processor 410 using embodiments of the present invention. In step 201, a test is done to determine if there is a group of instructions at the dispatch stage 140 of a shared pipeline in IDU 132. If the result of the test in step 201 is NO, then a branch is taken back to the input of step 201. If the result of the test in step 201 is YES, then in step 202, the thread identification (ID) is checked to identify the particular thread for the instruction group at the dispatch stage (in IDU 132). In step 203, the group is queued to dispatch from IDU 132 speculatively if appropriate. In step 204, a test is done to determine if required shared resources for the instruction group is available. If the shared resources are not available, then in step 209, the dispatch of the instruction group from IDU 132 is rejected. If the shared resources are available, then in step 205, a test is done to determine if thread specific resources are available. If the required thread specific resources are not available, then step 209 is executed and the dispatch is rejected. In step 206, a test is done to determine if any dispatch flush in IDU 132 is already in progress. If a dispatch flush is already in progress, then in step 209, the dispatch is rejected. If no dispatch flush is in progress, then in step 207, a test is done to determine if any flush of the thread corresponding to the instruction group in the dispatch stage is in progress. If the result of the test in step 207 is YES, then in step 209, the dispatch is rejected. If the result of the test in step 207 is NO, then in step 208, the instruction group is dispatched from dispatch stage 140.

Figure 3:
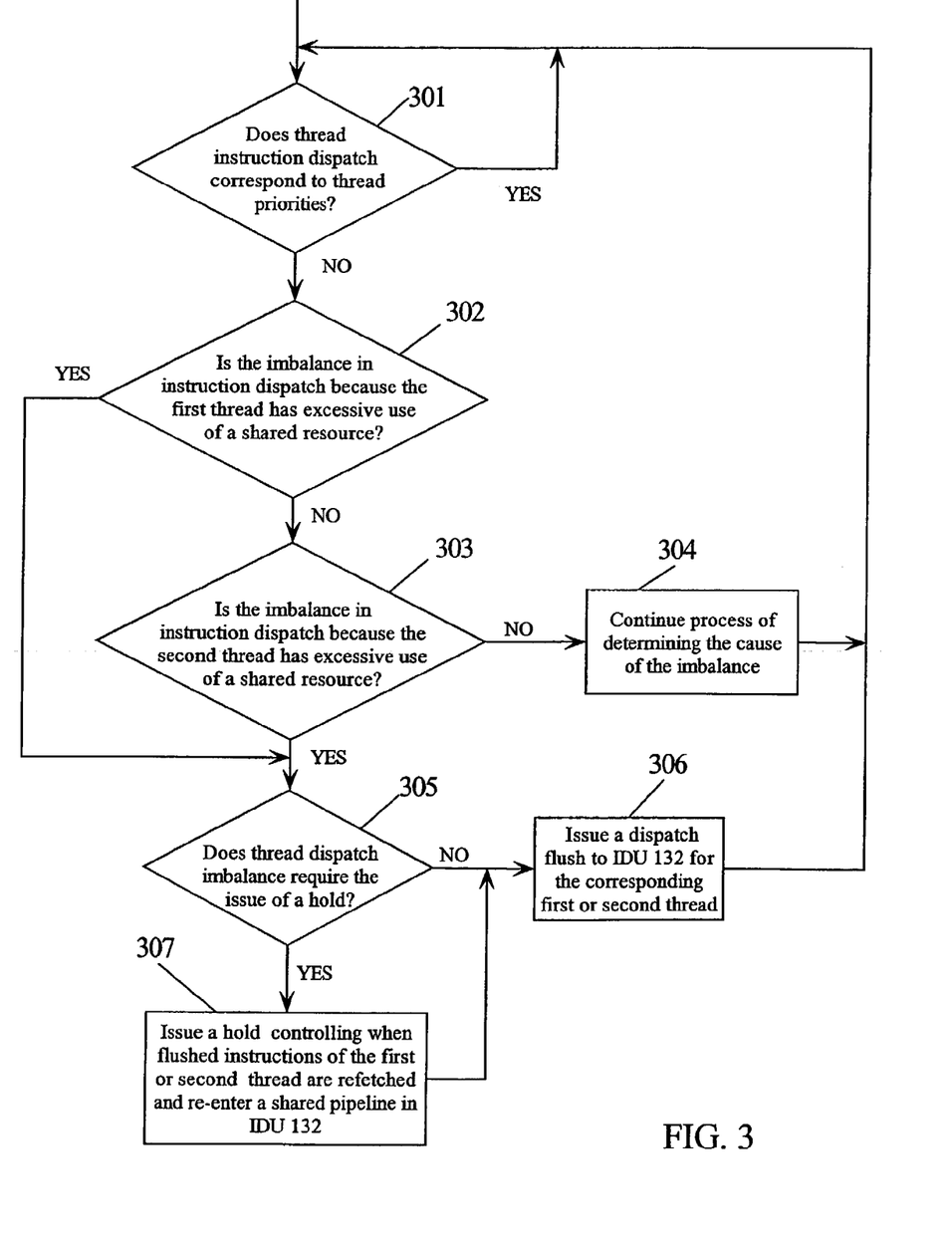
FIG. 3 is a flow diagram of method steps according to embodiments of the present invention.

FIG. 3 is a flow diagram of method steps used in embodiments of the present invention to manage instruction flow using dispatch flush because of a thread's dominance in the use of a shared resource (e.g., shared group completion table in completion unit 119). In step 301, a test is done to determine if instruction dispatch by each thread corresponds to thread priories. If the result of the test in step 301 is YES, then a branch is taken back to the input of step 301. If the result of the test in step 301 is NO, then in step 302 a test is done to determine if the imbalance in instruction dispatch from IDU 132 is because the first thread has excessive use of a shared resource. If the first thread does not have excessive use of a shared resource, then in step 303 a test is done to determine if the imbalance in instruction dispatch from IDU 132 is because the second thread has excessive use of a shared resource. If the result of the test in step 303 is NO, then in step 304 the process of determining the cause of the imbalance is continued and a branch is taken back to the input of step 301. If the result of the test in step 302 or step 303 is YES, then in step 305 a test is done to determine if the thread (thread one or thread two) instruction dispatch imbalance requires an issue of a hold operation for the corresponding thread. There may be more than one type of hold condition (e.g., dispatch hold or a cache line buffer (CLB) hold). A CLB hold will allow an instruction queue for the thread to fill, be flushed, but not decoded and sent to the IDU 132. If the result of the test in step 305 is YES, then in step 307 the hold is issued controlling when the flushed instructions are refetched and reenter the shared pipeline in IDU 132. Then in step 306, a dispatch flush for the corresponding first or second thread is issued to IDU 132 and a branch is taken back to step 301. If the result of the test in step 305 is NO, then no hold is issued and in step 306 the dispatch flush to IDU 132 for the corresponding first or second thread is issued and a branch is taken back to step 301.

Figure 5:
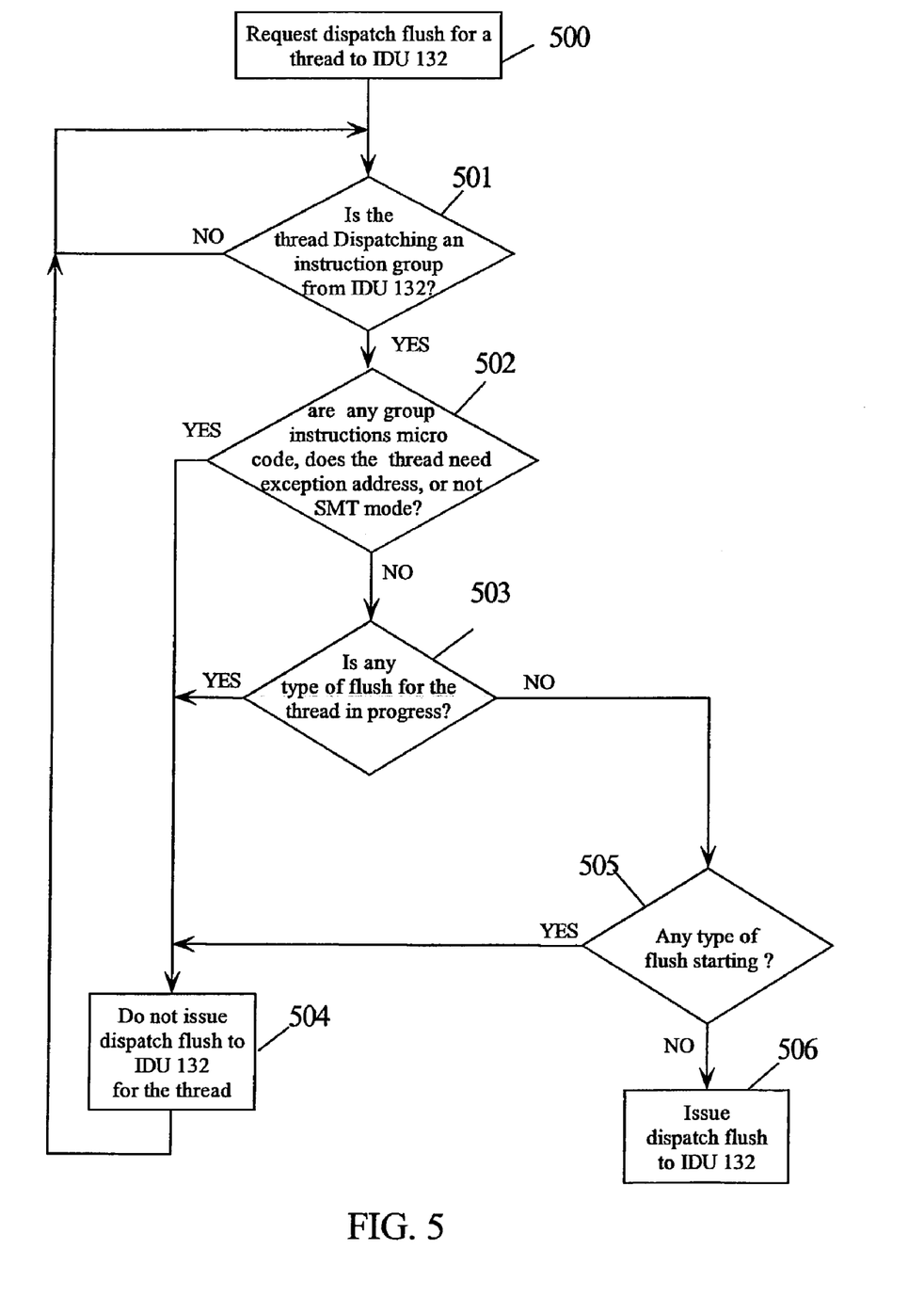
FIG. 5 is a flow diagram of method steps used in a dispatch flush operation in an SMT processor.

FIG. 5 is a flow diagram of method steps used in processing a dispatch flush operation in an SMT processor 410 using embodiments of the present invention. In step 500, a request for a dispatch flush for a selected thread is issued to IDU 132. In step 501, a test is done if the selected thread with the requested dispatch flush is dispatching an instruction group from IDU 132. If the selected thread is not dispatching an instruction group, then no dispatch flush is issued and a branch is taken back to the input of step 501. If the selected thread is dispatching an instruction group, then in step 502 a test is done to determine if any group instructions in the selected thread are micro code, the thread needs an exception address, or the SMT mode is not selected. If the result of the test in step 502 is YES, then in step 504 the dispatch flush is not issued. If the result of the test in step 502 is NO, then in step 503 a test is done to determine if the selected thread has any flush in progress. If the result of the test in step 503 is YES, then step 504 is again executed. If the result of the test in step 503 is NO, then in step 505 test is done to determine if any type of flush for the selected thread has started. At this time, if no flush has started, then in step 506 the dispatch flush for the selected thread is issued to IDU 132. If the result of the test in step 505 is YES, then step 504 is again executed and the dispatch flush to IDU 132 for the selected thread is not issued.

Figure 4:
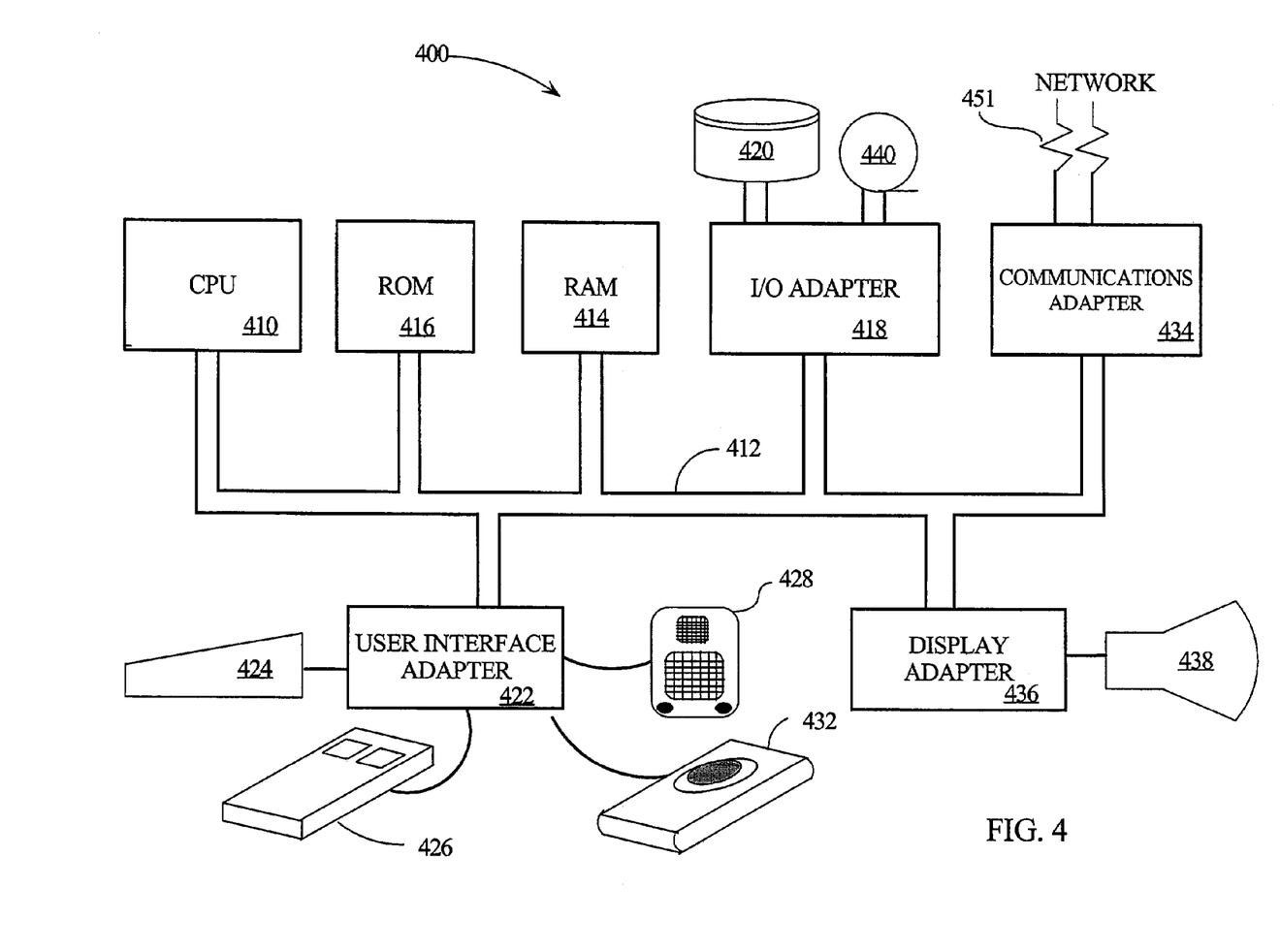
FIG. 4 is a representative hardware environment for practicing the present invention.

A representative hardware environment for practicing the present invention is depicted in FIG. 4, which illustrates a typical hardware configuration of a workstation 400 in accordance with the subject invention having central processing unit (CPU) 410 with simultaneous multithread (SMT) processing and a number of other units interconnected via system bus 412. The workstation 400 shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network 451, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method for managing instruction flow in an SMT processor having a shared dispatch pipeline comprising the steps of:
   detecting an imbalance in a dispatch of instructions of a first thread compared to dispatch of instructions of a second thread relative to their respective thread priority;
   determining if said imbalance is because a selected thread of said first or second has excessive use of a shared resource; and
   issuing a dispatch flush for instructions of said selected thread in said shared dispatch pipeline when said selected thread has excessive use of a shared resource.

2. The method of claim 1 further comprising the step of issuing a hold command setting a selected hold controlling when flushed instructions of said selected thread are refetched and reenter said shared dispatch pipeline in response to a first instruction in said flushed instructions.

3. The method of claim 2, wherein said selected hold is a cache line buffer (CLB) hold that allows instructions of said selected thread to be flushed from a dispatch queue in said shared dispatch pipeline, entered into said dispatch queue, but not dispatched until said CLB hold is removed.

4. The method of claim 2, wherein said first instruction has a long latency shared resource requirement that must be met before any instruction is dispatched from said shared dispatch pipeline.

5. The method of claim 4, wherein said first instruction comprises a Translation Look Aside Buffer Invalidate Exception instruction or a Sync instruction.

\* \* \* \* \*